United States Patent [19]

Maruyama et al.

[11] Patent Number: 5,181,889
[45] Date of Patent: Jan. 26, 1993

[54] TENSIONER FOR A TOOTHED BELT

[75] Inventors: Masao Maruyama; Nobuto Kozakura; Katsuya Nakakubo, all of Saitama, Japan

[73] Assignee: Tsubakimoto Chain Co., Osaka, Japan

[21] Appl. No.: 707,867

[22] Filed: May 30, 1991

[30] Foreign Application Priority Data

May 31, 1990 [JP] Japan ................ 2-56556[U]

[51] Int. Cl.⁵ ............................................. F16H 7/08
[52] U.S. Cl. ........................................ 474/110; 474/138
[58] Field of Search ............... 474/110, 135, 138, 139, 474/136

[56] References Cited

U.S. PATENT DOCUMENTS

| | | |
|---|---|---|
| 4,507,103 | 3/1985 | Mittermeier ............ 474/110 |
| 4,539,001 | 9/1985 | Okabe ................ 474/138 |
| 4,708,696 | 11/1987 | Kimura et al. ......... 474/138 X |
| 4,909,777 | 3/1990 | Inoue et al. .......... 474/135 X |
| 4,911,679 | 3/1990 | Inoue et al. .......... 474/138 X |
| 5,073,149 | 12/1991 | Maruyama et al. ....... 474/110 X |

Primary Examiner—Thuy M. Bui
Assistant Examiner—Roger J. Schoeppel
Attorney, Agent, or Firm—Howson & Howson

[57] ABSTRACT

A hydraulic fluid tensioner for a toothed belt, having a piston with a piston-carried ball and seat check valve, utilizes a ball pressing spring having a spring force more than 30 times the weight of the ball and less than 60% of force resulting from the hydraulic pressure acting on the ball and urging the check valve open as the piston moves in the projecting direction. The spring force prevents rapid accelerating movement of the piston, or vibrations of the tensioner, from causing irregular piston movements resulting in noise and vibration.

5 Claims, 4 Drawing Sheets

TENSIONER FOR A TOOTHED BELT

BRIEF SUMMARY OF THE INVENTION

This invention relates to tensioners for toothed belts, and more specifically to a hydraulic tensioner in which a piston, which divides a cylinder into two chambers, is provided with a spring-loaded check valve for establishing one-way flow of hydraulic fluid from one chamber to the other.

In many applications of toothed drive belts, it is necessary to prevent the belt from jumping over teeth of the driving or driven wheel. Prevention of such jumping is important in the case of a belt-driven camshaft in an internal combustion engine because tooth jumping will disrupt camshaft timing, possibly rendering the engine completely inoperative. Within an engine body, the ambient temperature may vary widely and can cause differences in belt tension due to the differences between the thermal expansion coefficients of the toothed belt and the other engine parts. Because of these differences in tension, vibrations, bumps, and the like can cause tooth jumping.

One approach to the problem of controlling the tension of a toothed belt is described in U.S. Pat. No. 4,708,696, dated Nov. 24, 1987. The tensioner described in U.S. Pat. No. 4,708,696 comprises a hydraulic fluid-filled cylinder having a piston with a rod projecting out of it. The piston divides the cylinder into front and rear chambers, and the rod extends from the piston, through the front chamber, and through a seal comprising a packing and a diaphragm, to the exterior of the cylinder. The rod engages a pivoted arm having a roller at one end for engaging the belt. A main spring within the cylinder urges the piston in the direction to reduce the size of the front chamber, and thereby urges the rod in the outward direction. A check valve carried by the piston allows the rod to move rapidly to take up slack in the belt. However, the rate of retraction is limited by hydraulic fluid which flows through the small clearance between the piston and the cylinder wall as the rod retracts. A path is provided between seals surrounding the rod to route air directly to the reservoir so that it does not enter the fluid chambers within the cylinder. The piston material is chosen to expand more rapidly than the cylinder with increasing temperatures therefore reducing variations in leakdown time.

The construction of the check valve in the tensioner of this type generally includes a ball seat located in a hydraulic fluid path, a ball for closing the fluid path extending through the piston, a spring for urging the ball in the toward the seat in order to close off the fluid path, and a retainer for holding the spring. The springs employed in the prior art have a relatively weak spring force so that when hydraulic fluid flows into the rear chamber from the front chamber as the piston moves forward, the ball is easily moved away from the ball seat and the entry of hydraulic fluid into the rear chamber is not impaired. More specifically, when the ball pressing spring is placed in pressure contact with the ball, the spring force F is typically twenty times the weight of the ball. That is, the force F is described by the formula:

$$F = 20 \times M \times G$$

where M is the mass of the ball and G is the acceleration due to gravity (980 cm./sec$^2$).

However, when the spring force is as described above, the tensioner does not always operate as it should. When the toothed belt loosens and tension is reduced, and the piston is urged forward by the force of the main spring, the check valve opens, and the ball is accelerated by hydraulic fluid flowing from the front chamber into the rear chamber. When tension in the belt is restored, and the piston and piston rod are urged in the retracting direction, however, the ball cannot immediately close the fluid pat and the piston is moved backward slightly by the diaphragm. In addition, when the engine speed increases, causing a quick change in the belt tension, or when the tensioner is vibrated, the ball can be jarred from its position in its retainer, causing irregular movement of the piston. As a result, a gap is formed between the far end of the piston rod and the pivoted arm, causing noises and vibrations and variations in the tension of the toothed belt.

The present invention overcomes the problems of the prior art which permitted variations in belt tension, noise and vibration. In the tensioner of the invention, the check valve ball operates in a stable manner by virtue of the fact that the spring force is set at a level within a range higher than the highest level used in prior art tensioners, thereby preventing noise and vibration, and lengthening the life of the toothed belt. The upper limit of the spring force is also set to insure that the operation of the check valve is not impeded by an unusually high force preventing the ball from moving from the ball seat.

The tensioner of the present invention has a check valve which comprises a ball pressing spring. The spring force of the ball pressing spring is set to at least 30 times the weight of the ball and less than or equal to 60% of the force resulting from hydraulic fluid pressure applied to the ball as the tensioner piston moves forward. The spring force is set by the following formulae:

Lower limit: $F_L \geq 30 \times M \times G$

Upper Limit: $F_U \leq 0.6 \times P_F \times A$ where M is the mass of the ball, G is the acceleration due to gravity, $P_F$ is the hydraulic pressure in the front chamber of the tensioner, and A is the area over which the ball is exposed to fluid pressure from the front chamber.

The lower limit value $F_L$ is set first. When the lower limit is set, the ball cannot be jarred from its position against the ball seat, and quickly closes when opened. Therefore, the ball stably closes the fluid path.

When the tension of the toothed belt is reduced and the forward motion of the main spring acts on the piston, the check valve is opened so that hydraulic fluid in the front chamber flows into the rear chamber through the fluid path. This allows the main spring to move the piston forward and causes the tension of the toothed belt to be adjusted to a moderate value.

As the engine speed increases, the tension of the toothed belt can alternately increase and decrease rapidly, causing the piston rod to move laterally. This causes the ball to be greatly accelerated by the piston rod. In prior art tensioners, the acceleration of the ball by the piston rod, as the rod moves in the retracting direction can cause the ball to move away from its seat. The ball can also be moved away from its seat by the acceleration produced by vibrations in the tensioner itself. In either case, the ball tends to "dance" within its retainer. However, "dancing" of the ball is significantly reduced by setting the spring force at a high tension, in accordance with the invention, so that unexpected movement of the ball away from its seat is prevented. In addition, when the force urging the piston in the retracting direction is applied by pivoted arm of the tensioner, the ball promptly closes the fluid path of the ball seat, preventing the piston from moving too far in the retracting direction. This prevents a clearance from developing between the piston rod and the crank arm.

The upper limit of the spring force is set to a value above the lower limit. However, in order to ensure that the spring force is not so high that the ball can not be disengaged from its seat when the check valve needs to be opened, the upper limit value must be less than or equal to 60% of force applied to the ball by hydraulic fluid pressure as the piston moves in the advancing direction. When the spring force is within the prescribed range, the tensioner can operate normally.

Where the fluid in the front chamber of the tensioner is separated from the atmosphere only by a flexible diaphragm, the pressure of the fluid in the front chamber is always substantially in equilibrium with atmospheric pressure. Therefore, to set the upper limit of spring force it is only necessary to know the area over which the ball is exposed to hydraulic pressure from the front chamber.

Other aspects of this invention will be understood from reference to the detailed description of the invention set out below.

DETAILED DESCRIPTION

Figure 1:
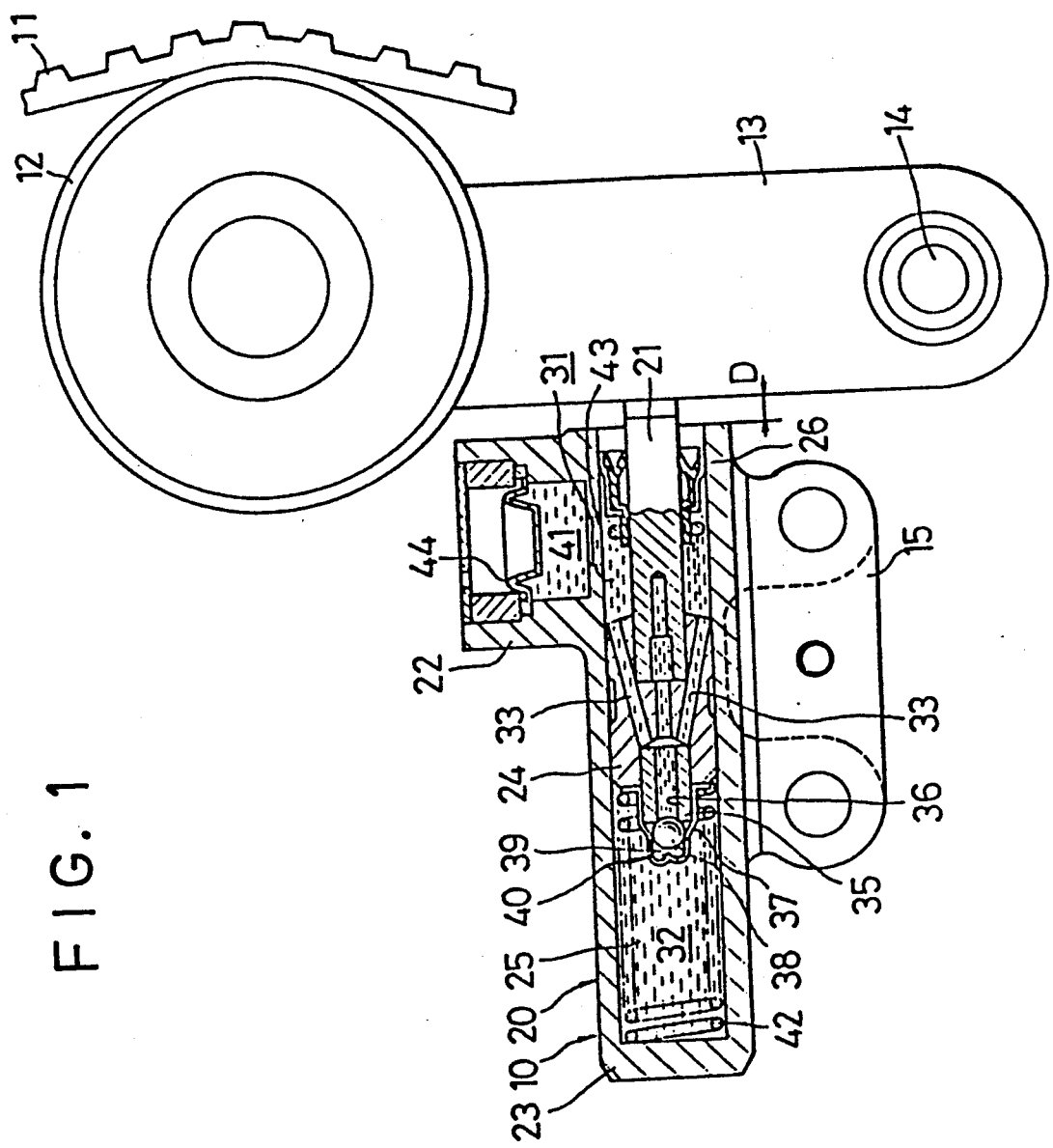
FIG. 1 is an elevational view showing a tensioner in accordance with the invention, partly in axial section to show the piston and check valve.
Figure 2:
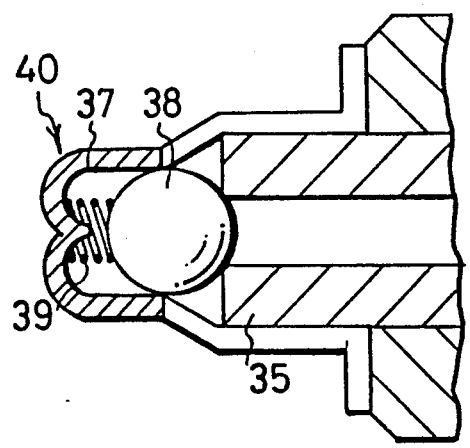
FIG. 2 is an enlarged fragmentary sectional view of the check valve in FIG. 1.

In FIG. 1, a pivoted arm, in the form of a support plate 13 holds a roller 12 in pressure contact with the return side portion of a toothed belt 11. Plate 13 is pivotally secured by a bolt 14 to a fixed member (not shown), for example an engine block. A tensioner, generally indicated by reference numeral 10 is also mounted on the fixed member adjacent to the pivoted support plate 13. The support plate is engaged and urged clockwise by a piston rod 21 which extends outward from a cylinder 20, also mounted on the fixed member by a mounting flange 15. The action of the piston rod against the roller support plate 13 causes the roller 12 to apply tension to toothed belt 11.

Cylinder 20 of tensioner 10 comprises a front reservoir portion 22 and a rear body portion 23. Cylinder 20 has a piston 24 loosely fitting and slidable therein, with a small clearance between the piston and the bore of the cylinder. Piston rod 21 is press fit to the piston. Cylinder 20 is provided with a seal 26, which prevents hydraulic fluid 25 within cylinder 20 from leaking. Piston 24 divides the interior of the cylinder into two chambers, a front chamber 31 and a rear chamber 32. Piston 24 is provided with oblique passage 33 which constitute portions of a hydraulic fluid path which connects front chamber 31 with rear chamber 32.

Figure 3:
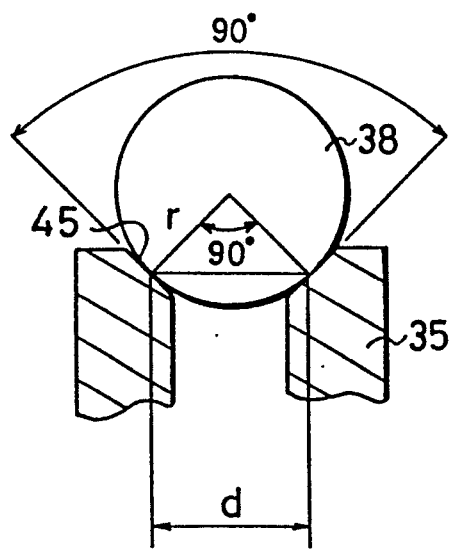
FIG. 3 is an enlarged fragmentary sectional view of the ball and seat of the check valve, illustrating the area over which the ball is exposed to hydraulic pressure from the front chamber of the tensioner.

A ball seat 35 is fitted to the left end of the piston 24. Ball seat 35 is provided with a central longitudinal hole 36, which is connected to the oblique passages 33. This hole is also part of the fluid path which connects front chamber 31 with rear chamber 32. An opening of hole 36 on the side of ball seat 35 within rear chamber 32 is formed with a seat surface 45, beveled at an angle of 45°, as shown in detail in FIG. 3, for an included angle of 90°. A main spring 42 is interposed in compression between a retainer 37 and an end of rear cylinder body portion 23. A ball 38 held in the center of retainer 37 is pressed into contact with seat surface 45 of the opening of longitudinal hole 36 by a ball pressing spring 39. This apparatus constitutes a check valve 40 which allows hydraulic fluid 25 from front chamber 31 to enter into rear chamber 32, but prevents flow in the opposite direction. Flow in the opposite direction takes place through the clearance between the piston and the wall of the cylinder. Alternatively, one or more separate restricted passages in the piston, in the cylinder wall, or in both, can be provided for return flow, if desired.

A hydraulic fluid reservoir 41 holds excess fluid from cylinder 20 when the available fluid volume in the cylinder is reduced as piston rod 21 and piston 24 move in the retracting direction. Flow into the reservoir takes place through a hole 43. The reservoir also accommodates changes in the volume of hydraulic fluid caused by thermal expansion. Reservoir 41 is covered by a diaphragm 44. Thus, the internal fluid pressure in reservoir 41 and front chamber 31 is in equilibrium with atmospheric pressure. (The pressure loss caused by the diaphragm may be disregarded as negligible.) Japanese Utility Model Application No. 63-141195, laid open in May, 1990, discloses a tensioner in which one end of a cylinder is closed by a diaphragm to form a front chamber. A similar diaphragm may also be used in the present invention and the Utility Model Application is incorporated by reference herein for a disclosure of the diaphragm.

A lower limit value and upper limit value of the spring force of the ball pressing spring 39 are set in the following manner.

The lower limit value is set so that the ball 38 does not "dance" within the retainer 37 even if vibrations occur within the piston 24 or tensioner 10 itself. The force is set so that the ball 38 is placed, under pressure, in contact with seat 35 immediately when the piston rod 21 changes from forward to retracting motion. Therefore, the lower limit value $F_L$ of the spring force, optimally, is in the range given in the following formula:

$$F_L \geq 30 \times m \times G$$

wherein M is the mass (in grams) of ball 38, and G is the acceleration due to gravity (980 cm/sec$^2$). The lower limit value $F_L$ is the value when the ball 38 is in contact with seat surface 45 of ball seat 35. Ball pressing spring 39 is preferably of the type having a spring coefficient which does not become lower due to metal fatigue.

Ball 38 is generally in the range of 5/32 inch to 7/32 inch (about 3.97 to 5.62 mm). Therefore, in the case where the density ρ of iron is 7.8 g/cm³, when balls of various sizes are used, the lower limit value $F_L$ is given by:

$F_L \geq 7506$ (g.cm/sec²) (for a 5/32 inch ball)

$F_L \geq 20596$ (g.cm/sec²) (for a 7/32 inch ball)

These numerical values can be determined primarily by the sizes of ball 38.

The upper limit value is set to prevent the detrimental effects of placing excessive force on ball pressing spring 39. For example, if too much force is placed on spring 39, check valve 40 will be unable to open. The upper limit value of the spring force is therefore set to be within the range shown by the following formula.

$F_U \leq 0.6 \times P_F \times A$ wherein $P_F$ is the hydraulic pressure in front chamber 31, and A represents the area (pressure receiving area) over which the ball 38 is exposed to hydraulic pressure from front chamber 31.

Because front chamber 31 is separated from the atmosphere only by a flexible diaphragm 44, the pressure within chamber 31 is substantially the same as atmospheric pressure, and it can be assumed that when piston 24 moves forward, the pressure (absolute pressure) of the piston rear chamber 32 is zero. Therefore, the pressure $P_F$ in the front chamber is given by:

$P_F = 9.8 \times 10^5$ g/cm sec².

The pressure receiving area A is the area surrounded by the circular line of contact of ball 38 and seat surface 45. Assuming that the angle of seat surface 45 is 45°, area A can be determined from the radius r of the ball by using the following formulae (FIG. 3):

$A = \pi (r \sin 45°)^2$ $A = \pi/2 \times r^2$

From the above formulae, when balls of various sizes are used, the pressure receiving area is given by:

$A = 6.185 \times 10^{-2}$ (cm²) (for a 5/32 inch ball)

$A = 1.212 \times 10^{-2}$ (cm²) (for a 7/32 inch ball).

The lower limit value is deduced from the above-calculated areas by the formula $F_U \leq 0.6 \times P_F \times A$:

$F_U \leq 36368$ (g cm/sec²) (for a 5/32 inch ball)

$F_U \leq 71266$ (g.cm/sec²) (for a 7/32 inch ball).

The following examples confirm the effect of a ball pressing spring upon a tensioner where the spring force is in the range according to the invention.

EXAMPLE 1

Confirmation of the lower limit value

Figure 4:
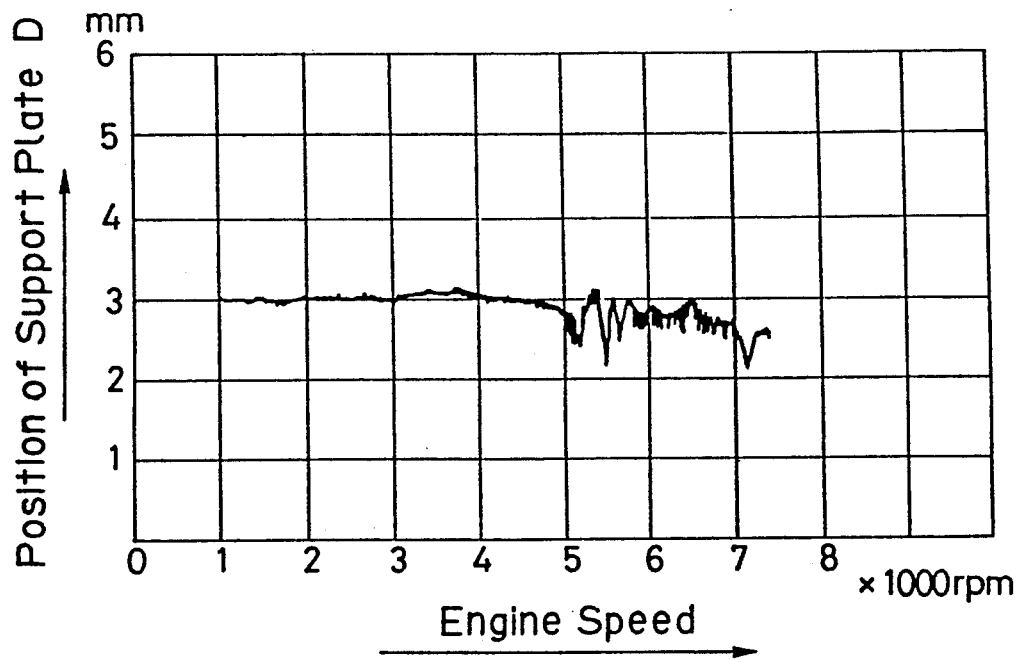
FIG. 4 is a graph showing the behavior of a tensioner with a conventional check valve ball pressing spring.
Figure 5:
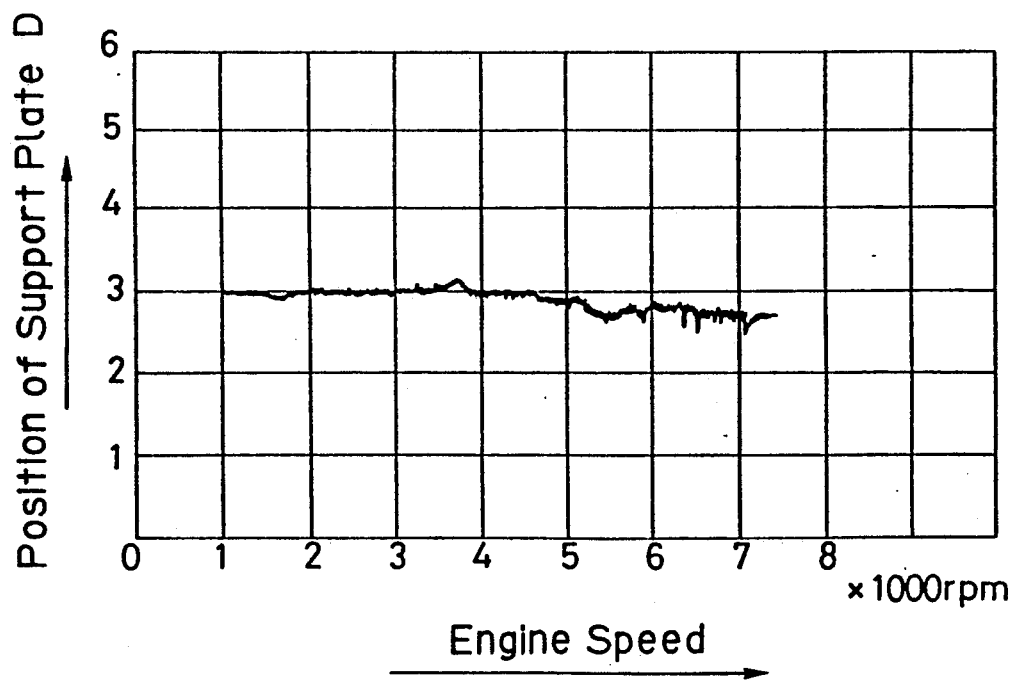
FIG. 5 is a graph showing the behavior of a tensioner having a ball pressing spring according to the invention.

FIG. 4 (prior art) and FIG. 5 (the present invention) are graphs showing the behavior of the support plate 13 with respect to engine speed when the lower limit value of the spring force of ball pressing spring 39 is set at various levels. As a test model, a gasoline engine was used. The tensioner 10 was mounted on the return side of a toothed belt for a cam shaft drive.

The experimental conditions were as follows:

|  | Dia. of Ball | Spring Force |
| --- | --- | --- |
| FIG. 4 | 5/32 inch | 20 × M × G |
| FIG. 5 | 5/32 inch | 30 × M × G |

The behavior of pivoted support plate 13 is represented by the spacing between the end of cylinder 20 and the support plate 13. As is apparent from these figures, in the tensioner in which spring force is set according to the present invention, the amplitude of movement of support plate 13 is small as compared with that of the prior art. Particularly, at high rotational speeds of the engine, the effect is remarkable.

EXAMPLE 2

Confirmation of the upper limit value

Figure 6:
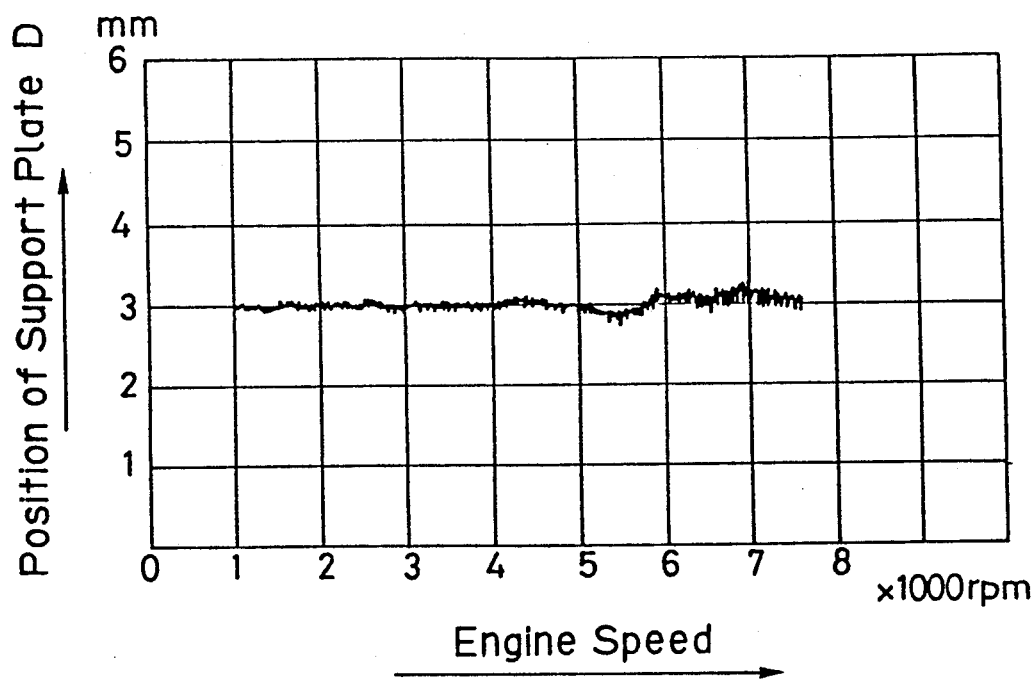
FIG. 6 and FIG. 7 are graphs illustrating the results of experiments conducted to confirm the operation of a tensioner in which the check valve spring force is set to the upper limit according to the present invention.
Figure 7:
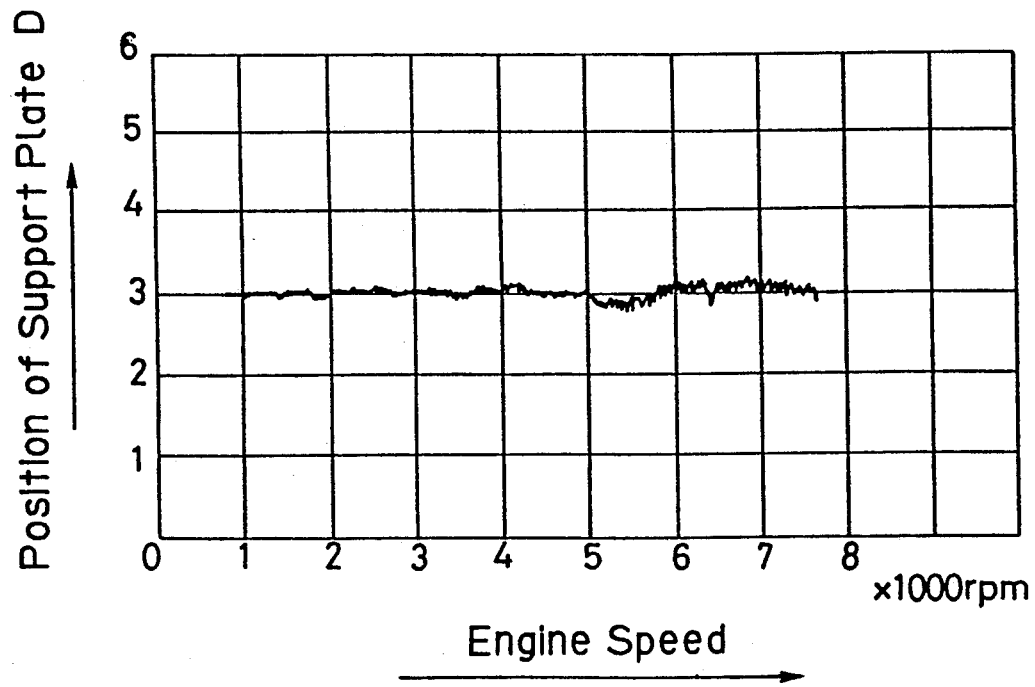

The present experiment was conducted to confirm that tensioner 10 operates normally when check valve 10 needs to be opened. The experimental conditions in FIGS. 6 and 7 are as follows:

|  | Dia. of Ball | Sring Force |
| --- | --- | --- |
| FIG. 6 | 5/32 inch | 0.6 × $P_F$ × A |
| FIG. 7 | 5/32 inch | 0.4 × $P_F$ × A |

From these figures, the conclusion has been drawn that if the above-described upper limit value is present, the tensioner is operating normally. Based upon these results, it can be concluded that, if the spring force is in the range of 30 × M × G or more, even if the lower limit value of the spring force is near the low end of the prescribed range, the vibrations of the roller support plate 13 are minute, and proper tension is applied to the toothed belt.

Numerous modifications and variations of the present invention can be made to the tensioner described herein without departing from the scope of the invention as defined in the following claims.

The invention provides a mechanism capable of reducing vibrations of the piston and tensioner, thereby reducing vibration of the toothed belt an preventing premature failure. In the present invention, the spring force of the ball pressing spring is set to a relatively high level according to the formulae described herein. This contrasts with the prior art in which a ball pressing spring having a weak spring force is used to rapidly effect entry of hydraulic fluid from the piston front chamber to the piston rear chamber.

The invention avoids noises produced in prior art tensioners as the result of a gap allowed between their piston rods and their roller support plates. It also greatly reduces eliminates vibration and noise in the toothed belt. In addition, the present invention permits the hydraulic fluid path to be closed rapidly when the piston changes from forward to retracting motion, and therefore, even if a small variation occurs in the tension of the toothed belt, the tensioner operates properly to maintain a predetermined tension on the toothed belt.

We claim:

1. A tensioner for a toothed belt comprising: a cylinder; a piston arranged to slide within said cylinder and dividing said cylinder into a front chamber and a rear chamber; a piston rod secured to said piston and extending in a projecting direction from the piston, through said front chamber, to the exterior of the cylinder; means extending between said piston rod and said cylinder and providing part of the boundary of said front chamber; means urging said piston in said projecting direction to cause said piston rod to project farther from said cylinder and to reduce the size of said front chamber; means providing a hydraulic fluid path through said piston between said front chamber and said rear chamber; means providing a restricted return path for flow of hydraulic fluid from said rear chamber to said front chamber; and check valve means in said hydraulic fluid path for permitting substantially free flow of hydraulic fluid from said front chamber to said rear chamber as the piston moves in said projecting direction, but substantially closing off flow of hydraulic fluid through said hydraulic fluid path when the piston moves in the retracting direction, said check valve means comprising a valve seat in said hydraulic fluid path, a ball, engageable with said valve seat, and of a size such that it closes off said hydraulic fluid path when engaged with said seat, and spring means resiliently urging said ball against said valve seat, in which the spring force of said spring means is at least thirty times the weight of said ball.

2. A tensioner according to claim 1 in which the spring force of said spring means is less than or equal to 60% of the force resulting from hydraulic pressure applied to said ball through said hydraulic fluid path as said piston and piston rod move in the projecting direction.

3. A tensioner according to claim 1 in which said ball, said valve seat, and said spring means are arranged so that said spring means urges said ball against said valve seat substantially in said projecting direction.

4. A tensioner according to claim 1 having a diaphragm separating the interior of said front chamber from the atmosphere, whereby the pressure within said front chamber is substantially the same as atmospheric pressure.

5. A tensioner according to claim 1 in which said valve seat is bevelled at an angle of approximately 45°, and wherein the force of said spring means is less than or equal to $$0.6 \times P_F \times \pi r^2 / 2$$

where
$P_F$ is atmospheric pressure; and
r is the radius of said ball.

* * * * *